(12) United States Patent
Harry Putra et al.

(10) Patent No.: US 12,039,408 B2
(45) Date of Patent: Jul. 16, 2024

(54) ESTIMATION OF AN EXPECTED ENERGY VALUE OF A HAMILTONIAN

(71) Applicant: International Business Machines Corporation, Armonk, NY (US)

(72) Inventors: Rudy Raymond Harry Putra, Yokohama (JP); Sergey Bravyi, Ossining, NY (US); Antonio Mezzacapo, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/316,074

(22) Filed: May 11, 2023

(65) Prior Publication Data
US 2023/0289637 A1    Sep. 14, 2023

Related U.S. Application Data

(62) Division of application No. 16/715,479, filed on Dec. 16, 2019, now Pat. No. 11,687,815.

(51) Int. Cl.
*G06N 10/00* (2022.01)
*G06F 17/16* (2006.01)

(52) U.S. Cl.
CPC .......... *G06N 10/00* (2019.01); *G06F 17/16* (2013.01)

(58) Field of Classification Search
CPC . G06F 1/02; G06F 15/16; G06F 17/11; G06F 17/16; G06F 17/50; G06F 17/5072;
(Continued)

(56) References Cited

U.S. PATENT DOCUMENTS 11,334,693 B1    5/2022  Flammia
11,687,815 B2 *  6/2023  Harry Putra ............. G06N 5/01
                                                                706/62
(Continued)

OTHER PUBLICATIONS

Hamamura et al., "Efficient evaluation of Pauli strings with entangled measurements", arXiv:1909.09119v1 [quant-ph], Sep. 19, 2019, 15 pages.

(Continued)

*Primary Examiner* — Shawkat M Ali
(74) *Attorney, Agent, or Firm* — Amin, Turocy & Watson, LLP

(57) ABSTRACT

Systems, computer-implemented methods, and computer program products to facilitate estimation of an expected energy value of a Hamiltonian based on data of the Hamiltonian, the quantum state produced by a quantum device and/or entangled measurements are provided. According to an embodiment, a system can comprise a memory that stores computer executable components and a processor that executes the computer executable components stored in the memory. The computer executable components can comprise a selection component that selects a quantum state measurement basis having a probability defined based on a ratio of a Pauli operator in a Hamiltonian of a quantum system. The computer executable components can further comprise a measurement component that captures a quantum state measurement of a qubit in the quantum system based on the quantum state measurement basis.

20 Claims, 12 Drawing Sheets

(58) Field of Classification Search
CPC . G06F 30/20; G06N 3/08; G06N 5/00; G06N 5/003; G06N 10/00; G06N 20/00; G06N 99/00
USPC .............................................. 706/62; 708/270
See application file for complete search history.

(56) References Cited

U.S. PATENT DOCUMENTS

| | | |
|---|---|---|
| 2019/0095811 A1 | 6/2019 | Antonio et al. |
| 2020/0160204 A1 | 5/2020 | Johnson et al. |

OTHER PUBLICATIONS

Zhao et al., "Measurement reduction in variational quantum algorithms", arXiv:1908.08067v1 [quant-ph], Aug. 21, 2019, 19 pages.
Crawford et al., "Efficient quantum measurement of Pauli operators", arXiv:1908.06942 [quant-ph], Aug. 19, 2019, 15 pages.
Zmaylov et al., "Unitary partitioning approach to the measurement problem in the Variational Quantum Eigensolver method", arXiv:1907.09040v2 [quant-ph], Oct. 18, 2019, 7 pages.
Gokhale et al., "Minimizing State Preparations in Variational Quantum Eigensolver by Partitioning into Commuting Families", arXiv:1907.13623v1 [quant-ph], Jul. 31, 2019, 23 pages.
Huggins et al., "Efficient and Noise Resilient Measurements for Quantum Chemistry on Near-Term Quantum Computers", arXiv:1907.13117v3 [quant-ph], Sep. 23, 2019, 10 pages.
Yen et al., "Measuring all compatible operators in one series of single-qubit measurements using unitary Transformations", arXiv:1907.09386v3 [quant-ph], Aug. 17, 2019, 11 pages.
Verteletskyi et al., "Measurement Optimization in the Variational Quantum Eigensolver Using a Minimum Clique Cover", arXiv:1907.03358v3 [quant-ph], Oct. 5, 2019, 6 pages.
Jena et al., "Pauli Partitioning with Respect to Gate Sets", arXiv:1907.07859v1 [quant-ph], Jul. 18, 2019, 7 pages.
Mell et al., "The NIST Definition of Cloud Computing," Recommendations of the National Institute of Standards and Technology, NIST Special Publication 800-145, Sep. 2011, 7 pages.
International Search Report and Written Opinion received for PCT Application Serial No. PCT/EP2020/084821 dated Mar. 12, 2021, 13 pages.
Non-Final Office Action received for U.S. Appl. No. 16/715,479, dated Jul. 5, 2022, 38 pages.
Final Office Action received for U.S. Appl. No. 16/715,479, dated Nov. 28, 2022, 28 pages.
Notice of Allowance received for U.S. Appl. No. 16/715,479, dated Feb. 23, 2023, 37 pages.
Response dated Jan. 18, 2023 to the communication pursuant to R 161 (1) and R 162 EPC dated Jul. 27, 2022 for EP Application No. 20820872.8, 7 pages.
Ikko Hamamura et al: "Efficient evaluation of Pauli strings with entangled measurements", Arxiv.org, Cornell University Library, 201 Olin Library Cornell University Ithaca, NY 14853, Sep. 19, 2019.
Andrew Jena et al: "Pauli Partitioning with Respect to Gate Sets", Arxiv.org, Cornell University Library, 201 Olin Library Sornell University Ithaca, NY 14853, Jul. 18, 2019.
Tzu-Ching Yen et al: "Measuring all compatible operators in one series of a single-qubit measurements using unitary transformations", Arxiv.org, Cornell University Library, 201 Olin Library Cornell University Ithaca, NY 14853, Jul. 22, 2019.
William J Huggins et al: "Efficient and Noise Resilient Measurements for Quantum Chemistry on Near-Term Quantum Computers", Sep. 23, 2019.
Notice of Allowance received for U.S. Appl. No. 16/715,479, dated Mar. 3, 2023, 6 pages.
List of IBM applications treated as related—Appendix P, Jan. 25, 2016, 2 Pages.

\* cited by examiner

Algorithm 1 Estimating a 2-qubit system for $t = 1, 2, \ldots, S$ do
    Prepare $|\psi\rangle$ with a quantum computer
    Pick uniformly at random the basis $b$ to be either $\Omega$, $\Sigma$, or $\Xi$.
    Measure $|\psi\rangle$ in the basis $b$ and record the result $v \in \{00, 01, 10, 11\}$.
    Let $|v_b\rangle$ be the state in the basis $b$ with the measurement result $v$.
    Compute $w_t = \langle v_b | \mathbf{H} | v_b \rangle$ by classical computer
return $w = \frac{3}{S} \sum_{t=1}^{S} w_t$

FIG. 4A

Algorithm 2 Estimating a $2n$-qubit system which is a sum of *consecutive* weight-$2k$ Pauli operators for $t = 1, 2, \ldots, S$ do
    Prepare $|\psi\rangle$ with quantum devices
    Flip a fair coin $C$ to obtain EVEN or ODD
    for $i = 1, 2, \ldots, n$ do
        Pick uniformly at random the basis $b$ to be either $\Omega, \Sigma,$ or $\Xi$.
        If $C$ is EVEN, measure $2(i-1)$ and $2i-1$ qubits. Otherwise, measure $2i-1$ and $2i$ qubits of $|\psi\rangle$ in the basis $b$
        Record the result $v_{b_i} \in \{00, 01, 10, 11\}$.

Let $|v_b^C\rangle$ be the quantum state obtained from $n$ entangled measurements.
    Compute $w_t = \langle v_b^C | \mathbf{H} | v_b^C \rangle$ by classical computer return $w = \frac{2 \cdot 3^k}{S} \sum_{t=1}^{S} w_t$

FIG. 4B

Algorithm 3 Estimating a $n$-qubit system with partial knowledge of the ratio of Pauli operators: $x:y:z$ be $\alpha:(1-\alpha)/2:(1-\alpha)/2:(1-\alpha)/2$, for $0 \leq \alpha \leq 1$ for $t = 1, 2, \ldots, S$ do
    Prepare $|\psi\rangle$ with a quantum computer
    for $i = 1, 2, \ldots, n$ do
        Pick the basis $b_i$ to be either $x$, $y$, or $z$ with probability $\alpha, (1-\alpha)/2, (1-\alpha)/2$, respectively.
        Measure $|\psi\rangle$ in the basis $b_i$ and record the result $v^i \in \{0,1\}$.
    Let $|v_b\rangle = |v_{b_1}^1\rangle \otimes |v_{b_2}^2\rangle \otimes \ldots \otimes |v_{b_n}^n\rangle$
    Compute $w_t = \langle v_b | H | v_b \rangle \dfrac{-k}{\alpha^c \left(\dfrac{1-\alpha}{2}\right)^{(1-\alpha)}}$ by classical computer return $w = \dfrac{\left(\alpha^c \left(\dfrac{1-\alpha}{2}\right)\right)}{S} \sum_{t=1}^{S} w_t$

FIG. 4C

ESTIMATION OF AN EXPECTED ENERGY VALUE OF A HAMILTONIAN

BACKGROUND

The subject disclosure relates to estimating an expected energy value of a Hamiltonian, and more specifically, to estimating an expected energy value of a Hamiltonian based on data of the Hamiltonian and/or entangled measurements.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate estimation of an expected energy value of a Hamiltonian based on data of the Hamiltonian and/or entangled measurements are described.

According to an embodiment, a system can comprise a quantum device that generates quantum states which will be used to compute the expected energy of a Hamiltonian of a quantum system, a memory that stores computer executable components and a processor that executes the computer executable components stored in the memory. The computer executable components can comprise a selection component that selects a quantum state measurement basis having a probability defined based on a ratio of a Pauli operator in a Hamiltonian of a quantum system. The computer executable components can further comprise a measurement component that captures a quantum state measurement of a qubit in the quantum system based on the quantum state measurement basis.

According to another embodiment, a computer-implemented method can comprise selecting, by a system operatively coupled to a processor, a quantum state measurement basis having a probability defined based on a ratio of a Pauli operator in a Hamiltonian of a quantum system. The computer-implemented method can further comprise capturing, by the system, a quantum state measurement of a qubit in the quantum system based on the quantum state measurement basis.

According to another embodiment, a computer program product facilitating a process to estimate an expected energy value of a Hamiltonian is provided. The computer program product comprising a computer readable storage medium having program instructions embodied therewith, the program instructions executable by a processor to cause the processor to select, by the processor, a quantum state measurement basis having a probability defined based on a ratio of a Pauli operator in a Hamiltonian of a quantum system. The program instructions are further executable by the processor to cause the processor to capture, by the processor, a quantum state measurement of a qubit in the quantum system based on the quantum state measurement basis.

According to an embodiment, a system can comprise a quantum device that generates quantum states which will be used to compute the expected energy of a Hamiltonian of a quantum system, a memory that stores computer executable components and a processor that executes the computer executable components stored in the memory. The computer executable components can comprise a measurement component that captures entangled quantum state measurements of qubits in a quantum system based on an entangled quantum state measurement basis. The computer executable components can further comprise a computation component that computes an expected energy value of a Hamiltonian of the quantum system based on the entangled quantum state measurements.

According to another embodiment, a computer-implemented method can comprise capturing, by a system operatively coupled to a processor, entangled quantum state measurements of qubits in a quantum system based on an entangled quantum state measurement basis. The computer-implemented method can further comprise computing, by the system, an expected energy value of a Hamiltonian of the quantum system based on the entangled quantum state measurements.

DESCRIPTION OF THE DRAWINGS

FIGS. 4A, 4B, and 4C illustrate diagrams of example, non-limiting algorithms that can facilitate estimation of an expected energy value of a Hamiltonian based on data of the Hamiltonian, a quantum state produced by a quantum device, and/or entangled measurements in accordance with one or more embodiments described herein.

DETAILED DESCRIPTION

Figure 1:
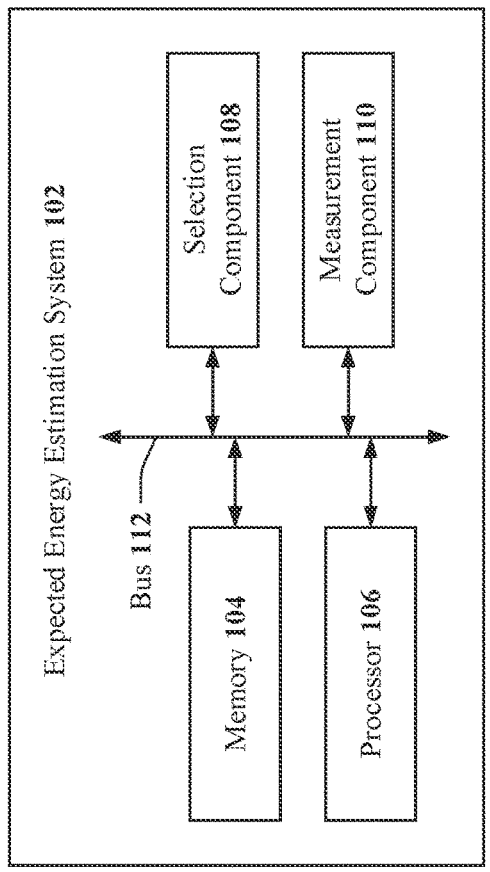
FIG. 1 illustrates a block diagram of an example, non-limiting system that can facilitate estimation of an expected energy value of a Hamiltonian based on data of the Hamiltonian, a quantum state produced by a quantum device, and/or entangled measurements in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. However, quantum computing requires to formulate problems into the forms it can operate with quantum operation sets it has. Almost all of such problems can be turned into the formulation of finding the lowest energy with respect to a Hamiltonian that describe the given problem. To find the lowest energy, one has to perform iteration of expected energy value of the Hamiltonian with regards to quantum states that eventually correspond to the lowest energy or its approximation.

Variational Quantum Eigensolver (VQE) is a classical-quantum hybrid algorithm that utilizes near-term quantum devices for approximating the lowest eigensystem, eigenvalues and eigenvectors, of a given Hamiltonian H. By transforming a Hamiltonian of, for example, quantum chemistry or optimization problems into a qubit Hamiltonian H, VQE is used to find a parameter θ that minimizes the expected energy $$\min_\theta \langle \psi(\theta) | H | \psi(\theta) \rangle$$

The parameter θ is used to prepare a quantum circuit generating the quantum state $|\psi(\theta)\rangle$. For each such quantum state $|\psi(\theta)\rangle$, the expected energy is evaluated by the expectation values of weighted sum of Pauli strings that comprise H. The values are obtained by measuring the quantum states in the standard computational bases (as often the limitation of near-term quantum devices). A straightforward approach is to measure the expected value of each term of the Pauli strings of H, but this can be time consuming because in typical quantum chemistry problems there can be $n^4$ Pauli strings (where n is the number of qubits).

Each iteration of the VQE, to evaluate the expected value of the Hamiltonian with regards to fixed parameters θ, requires many measurements. Reducing the number of measurements is important for utilizing VQE to solve problems in, for example, quantum chemistry and optimization, as it directly translates to faster execution of various quantum algorithms that promise quantum advantages.

Currently, there are many proposed prior art approaches to reduce the number of measurements of VQE. However, a problem with some of such prior art approaches is that they resort to solving graph problems (e.g., node coloring, independent set, etc.) that are known to be non-deterministic polynomial-time hard (NP-hard) problems, and moreover their approximation algorithms can be expensive to run on classical algorithms (e.g., computationally expensive). Another problem with some of such prior art approaches is that they do not provide theoretical guarantees of the expected errors and variances, and do not provide bounds on the sufficient number of repetitions for approximating the expected values.

FIG. 1 illustrates a block diagram of an example, non-limiting system 100 that can facilitate estimation of an expected energy value of a Hamiltonian based on data of the Hamiltonian, a quantum device that generates quantum states which will be used to compute the expected energy of a Hamiltonian of a quantum system and/or entangled measurements in accordance with one or more embodiments described herein. System 100 can comprise an expected energy estimation system 102, which can be associated with a cloud computing environment. For example, expected energy estimation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Expected energy estimation system 102 and/or components thereof (e.g., selection component 108, measurement component 110, state generation component 202, computation component 302, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by expected energy estimation system 102 and/or components thereof to execute one or more operations in accordance with one or more embodiments of the subject disclosure described herein. For instance, expected energy estimation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Expected energy estimation system 102 can comprise a memory 104, a processor 106, a selection component 108, a measurement component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or expected energy estimation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to expected energy estimation system 102, selection component 108, measurement component 110, and/or another component associated with expected energy estimation system 102 (e.g., state generation component 202, computation component 302, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Expected energy estimation system 102, memory 104, processor 106, selection component 108, measurement component 110, and/or another component of expected energy estimation system 102 as described herein (e.g., state generation component 202, computation component 302, etc.) can be communicatively, electrically, operatively, and/or optically coupled to one another via a bus 112 to perform functions of system 100, expected energy estimation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Expected energy estimation system 102 can comprise any type of component, machine, device, facility, apparatus, and/or instrument that comprises a processor and/or can be capable of effective and/or operative communication with a wired and/or wireless network. All such embodiments are envisioned. For example, expected energy estimation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Expected energy estimation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, expected energy estimation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, expected energy estimation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, expected energy estimation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between expected energy estimation system 102 and external systems, sources, and/or devices (e.g., computing devices, communication devices, etc.).

Expected energy estimation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with expected energy estimation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, selection component 108, measurement component 110, and/or any other components associated with expected energy estimation system 102 as disclosed herein (e.g., communicatively, electronically, operatively, and/or optically coupled with and/or employed by expected energy estimation system 102), can comprise such computer and/or machine readable, writable, and/or executable component(s) and/or instruction(s). Consequently, according to numerous embodiments, expected energy estimation system 102 and/or any components associated therewith as disclosed herein, can employ processor 106 to execute such computer and/or machine readable, writable, and/or executable component(s) and/or instruction(s) to facilitate performance of one or more operations described herein with reference to expected energy estimation system 102 and/or any such components associated therewith.

Expected energy estimation system 102 can facilitate (e.g., via processor 106) performance of operations executed by and/or associated with selection component 108 and/or measurement component 110. For example, in embodiments where data of a Hamiltonian is given, and the ratio of Pauli basis is fixed (e.g., data of a Hamiltonian as defined below), expected energy estimation system 102 can: employ selection component 108 to select a quantum state measurement basis having a probability defined based on a ratio of a Pauli operator in a Hamiltonian of a quantum system; and/or further employ measurement component 110 to capture a quantum state measurement of a qubit in the quantum system based on the quantum state measurement basis. If the ratio of Pauli basis is not fixed, then the selection expected energy estimation system 102 can: employ selection component 108 to select a quantum state measurement basis having a probability uniform at random; and/or further employ measurement component 110 to capture a quantum state measurement of a qubit in the quantum system based on the quantum state measurement basis. Measurement component 110 can comprise, for instance, a vector network analyzer (VNA) that can capture one or more quantum state measurements of one or more qubits of a quantum system.

In such embodiments described above where data of a Hamiltonian is known (e.g., data of a Hamiltonian as defined below), expected energy estimation system 102 can employ measurement component 110 to capture the quantum state measurement of the qubit based on the quantum state measurement basis to reduce at least one of: a number of quantum state measurements of the qubit used to compute an expected energy value of the Hamiltonian; or execution time of the quantum system to execute a variational quantum eigensolver (VQE) algorithm. In these embodiments, the quantum state measurement basis can comprise a basis state of a stabilizer state, a single qubit stabilizer state, and/or multiqubit quantum states that span quantum states comprising a defined number of nonidentity Pauli matrices and the Hamiltonian can comprise a sum of weighted Pauli strings comprising the defined number of the nonidentity Pauli matrices.

In embodiments where a Hamiltonian is in the form of a Heisenberg model, expected energy estimation system 102 can employ measurement component 110 to capture entangled quantum state measurements of qubits in a quantum system based on an entangled quantum state measurement basis. For instance, if the Hamiltonian is in the form of a Heisenberg model, expected energy estimation system 102 can employ measurement component 110 to capture entangled quantum state measurements of qubits (e.g., entangled qubits) in a quantum system (e.g., a 2-qubit quantum system) based on an entangled quantum state measurement basis (e.g., a 2-qubit quantum state). In these embodiments, expected energy estimation system 102 can employ measurement component 110 to capture the entangled quantum state measurements of the qubits based on the entangled quantum state measurement basis to reduce at least one of: a number of quantum state measurements of the qubits used to compute the expected energy value of the Hamiltonian; or execution time of the quantum system to execute a variational quantum eigensolver (VQE) algorithm. In these embodiments, the entangled quantum state measurement basis can comprise a two qubit (2-qubit) quantum state and the Hamiltonian can comprise a sum of consecutive weighted Pauli strings comprising a defined number of nonidentity Pauli matrices. In these embodiments, as described below with reference to algorithm 400b illustrated in FIG. 4B, expected energy estimation system 102 can employ measurement component 110 to capture the entangled quantum state measurements of the qubits based on an even result or an odd result of a flipped fair coin.

Expected energy estimation system 102 can further facilitate (e.g., via processor 106) performance of operations executed by and/or associated with one or more other components of expected energy estimation system 102. For example, expected energy estimation system 102 can further facilitate performance of operations executed by and/or associated with state generation component 202 as described below with reference to FIG. 2.

Figure 2:
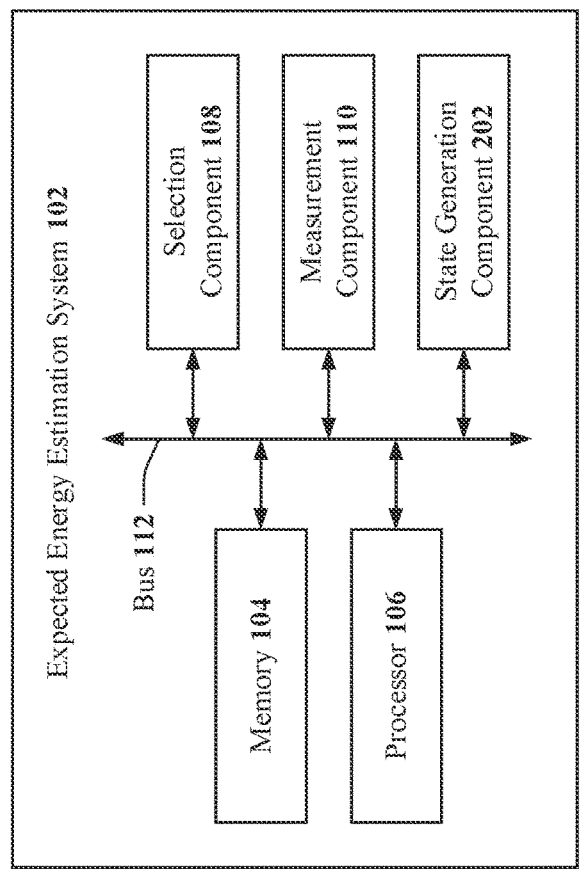
FIG. 2 illustrates a block diagram of an example, non-limiting system that can facilitate estimation of an expected energy value of a Hamiltonian based on data of the Hamiltonian, a quantum state produced by a quantum device, and/or entangled measurements in accordance with one or more embodiments described herein.

FIG. 2 illustrates a block diagram of an example, non-limiting system 200 that can facilitate estimation of an expected energy value of a Hamiltonian based on data of the Hamiltonian and/or entangled measurements in accordance with one or more embodiments described herein. System 200 can comprise expected energy estimation system 102. In some embodiments, expected energy estimation system 102 can comprise a state generation component 202. Repetitive description of like elements and/or processes employed in respective embodiments is omitted for sake of brevity.

In such embodiments described above where data of a Hamiltonian is known (e.g., data of a Hamiltonian as defined below), expected energy estimation system 102 can employ state generation component 202 to generate a product quantum state based on quantum state measurements of a qubit captured based on multiple quantum state measurement bases. For instance, in these embodiments, expected energy estimation system 102 can employ state generation component 202 to generate a product quantum state based on quantum state measurements of a qubit that can be captured by measurement component 110 as described above, where such measurements can be captured based on (e.g., using) multiple quantum state measurement bases that can be selected by selection component 108 as described above.

In such embodiments described above where a Hamiltonian is in the form of a Heisenberg model, expected energy estimation system 102 can employ state generation component 202 to generate a quantum state based on multiple entangled quantum state measurements of qubits captured based on multiple entangled quantum state measurement bases. For example, in these embodiments, expected energy estimation system 102 can employ state generation component 202 to generate a quantum state based on multiple entangled quantum state measurements of qubits that can be captured by measurement component 110 as described above, where such measurements can be captured based on (e.g., using) multiple entangled quantum state measurement bases (e.g., multiple 2-qubit quantum states).

Expected energy estimation system 102 can further facilitate (e.g., via processor 106) performance of operations executed by and/or associated with one or more other components of expected energy estimation system 102. For example, expected energy estimation system 102 can further facilitate performance of operations executed by and/or associated with computation component 302 as described below with reference to FIG. 3.

Figure 3:
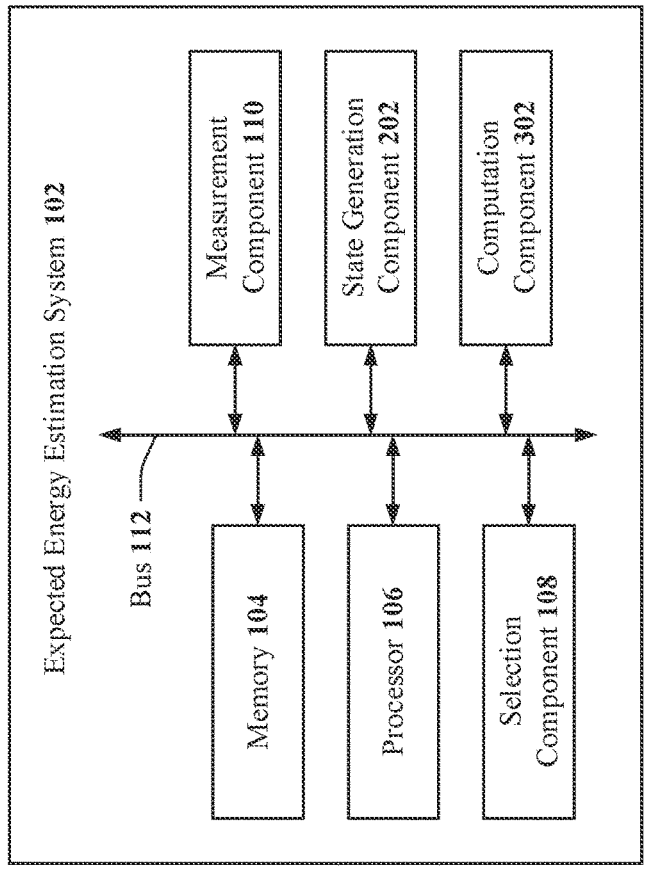
FIG. 3 illustrates a block diagram of an example, non-limiting system that can facilitate estimation of an expected energy value of a Hamiltonian based on data of the Hamiltonian, a quantum state produced by a quantum device, and/or entangled measurements in accordance with one or more embodiments described herein.

FIG. 3 illustrates a block diagram of an example, non-limiting system 300 that can facilitate estimation of an expected energy value of a Hamiltonian based on data of the Hamiltonian and/or entangled measurements in accordance with one or more embodiments described herein. System 300 can comprise expected energy estimation system 102. In some embodiments, expected energy estimation system 102 can comprise a computation component 302. Computation component 302 can comprise a classical computer (e.g., desktop computer, laptop computer, etc.). Repetitive description of like elements and/or processes employed in respective embodiments is omitted for sake of brevity.

In such embodiments described above where data of a Hamiltonian is known (e.g., data of a Hamiltonian as defined below), expected energy estimation system 102 can employ computation component 302 to compute an expected energy value of the Hamiltonian based on a product quantum state generated based on quantum state measurements of a qubit captured based on multiple quantum state measurement bases. For instance, in these embodiments, expected energy estimation system 102 can employ computation component 302 to compute an expected energy value of the Hamiltonian based on the product quantum state that can be generated by state generation component 202 based on quantum state measurements of a qubit that can be captured by measurement component 110 based on (e.g., using) multiple quantum state measurement bases that can be selected by selection component 108 as described above.

In such embodiments described above where a Hamiltonian is in the form of a Heisenberg model, expected energy estimation system 102 can employ computation component 302 to compute an expected energy value of the Hamiltonian of a quantum system based on entangled quantum state measurements. For example, in these embodiments, to compute an expected energy value of the Hamiltonian of a quantum system based on the entangled quantum state measurements of qubits (e.g., entangled qubits) that can be captured by measurement component 110 as described above.

Unbiased Estimation with Entangled Measurement

To facilitate performance of one or more of the example operations defined above and thereby enable estimation of an expected energy value of a Hamiltonian based on data of the Hamiltonian and/or entangled measurements, expected energy estimation system 102 and/or the component(s) thereof (e.g., selection component 108, measurement component 110, state generation component 202, computation component 302, etc.) can employ one or more of the quantum states, equations, algorithms, and/or lemmas described below. For example, expected energy estimation system 102 and/or the component(s) thereof (e.g., selection component 108, measurement component 110, state generation component 202, computation component 302, etc.) can employ one or more of the quantum states, equations, algorithms, and/or lemmas described below to obtain the unbiased estimation of $\langle \psi | H | \psi \rangle$ for some Hamiltonian H and any quantum state $|\psi\rangle$.

If data of a Hamiltonian is known, expected energy estimation system 102 (e.g., via selection component 108, measurement component 110, state generation component 202, computation component 302, etc.) can obtain an estimation of an expected energy value of a Hamiltonian based on such data of the Hamiltonian. For instance, if data of a Hamiltonian is known, expected energy estimation system 102 (e.g., via selection component 108, measurement component 110, state generation component 202, computation component 302, etc.) can obtain an estimation of an expected energy value of the Hamiltonian based on such data of the Hamiltonian by implementing the process described below with reference to section 2.0 (e.g., by implementing one or more quantum states, equations, algorithms, and/or lemmas defined below in section 2.0).

In an example, such data of the Hamiltonian can be that the Hamiltonian H is an n-qubit system which is a sum of at most weight-k Pauli strings. For example, below is a Hamiltonian H for a 4-qubit system with exactly weight-3 Pauli strings because the number of non-identity Pauli matrices (denoted as I) at every term is exactly 3.

$$H = a_1 IXYZ + a_2 XIXZ + a_3 XZYI + a_4 ZXYI$$

In another example, such data of the Hamiltonian can be that there is at least a Pauli matrix whose ratio is the same for each term. For example, in the above Hamiltonian, Z always appears once in each term and hence its ratio is 1/3 (e.g., in general, 1/k for k>3). If no such ratio exists in the Hamiltonian, for example, when H=XX+YY+ZZ, expected energy estimation system 102 can use a ratio of X:Y:Z is 1:1:1.

In another example, such data of the Hamiltonian can be that the Hamiltonian H is a sum of consecutive weight-2 k Pauli strings. For example, H=XX+YY+ZZ is that of consecutive weight-2 Pauli strings, H=XXXX+YYYY+ZZZZ is that of weight-4, and so on.

If the Hamiltonian is in the form of a Heisenberg model, expected energy estimation system 102 (e.g., via selection component 108, measurement component 110, state generation component 202, computation component 302, etc.) can obtain the unbiased estimation using the entangled measurement process described below with reference to sections 1.0-1.6, as such a process can be more efficient than individual qubit measurement. For instance, if the Hamiltonian is in the form of a Heisenberg model, expected energy estimation system 102 (e.g., via selection component 108, measurement component 110, state generation component 202, computation component 302, etc.) can implement one or more quantum states, equations, algorithms, and/or lemmas defined below in sections 1.0-1.6.

1.0 Quantum States

Expected energy estimation system 102 and/or the component(s) thereof (e.g., selection component 108, measurement component 110, state generation component 202, computation component 302, etc.) can use the following 2-qubit quantum states to simultaneously measure a 2-qubit system.

1.1 $\Omega$ States

The $\Omega$ states can be used by expected energy estimation system 102 to obtain the coefficients of II, XZ, YY, and ZX. They are as follows.

$$|\Omega_{00}\rangle = \frac{1}{2}(|00\rangle + |01\rangle - |10\rangle + |11\rangle) \quad (1)$$

$$|\Omega_{01}\rangle = \frac{1}{2}(-|00\rangle + |01\rangle + |10\rangle + |11\rangle) \quad (2)$$

$$|\Omega_{10}\rangle = \frac{1}{2}(|00\rangle + |01\rangle + |10\rangle - |11\rangle) \quad (3)$$

$$|\Omega_{11}\rangle = \frac{1}{2}(|00\rangle - |01\rangle + |10\rangle + |11\rangle) \quad (4)$$

The corresponding density matrices of the above quantum states are as follows.

$$\Omega_{00} = \frac{1}{4}(II - XZ - YY + ZX) \quad (5)$$

$$\Omega_{01} = \frac{1}{4}(II - XZ + YY - ZX) \quad (6)$$

$$\Omega_{10} = \frac{1}{4}(II + XZ + YY + ZX) \quad (7)$$

$$\Omega_{11} = \frac{1}{4}(II + XZ - YY - ZX) \quad (8)$$

1.2 Σ States

The Σ states can be used by expected energy estimation system 102 to obtain the coefficients of II, XY, YX, and ZZ.

$$|\Sigma_{00}\rangle = \frac{1}{\sqrt{2}}(|01\rangle - i|10\rangle) \quad (9)$$

$$|\Sigma_{10}\rangle = \frac{1}{\sqrt{2}}(|01\rangle + i|10\rangle) \quad (10)$$

$$|\Sigma_{10}\rangle = \frac{1}{\sqrt{2}}(|00\rangle - i|11\rangle) \quad (11)$$

$$|\Sigma_{11}\rangle = \frac{1}{\sqrt{2}}(|00\rangle + i|11\rangle) \quad (12)$$

The corresponding density matrices of the above quantum states are as follows.

$$\Sigma_{00} = \frac{1}{4}(II + XY - YX - ZZ) \quad (13)$$

$$\Sigma_{01} = \frac{1}{4}(II - XY + YX - ZZ) \quad (14)$$

$$\Sigma_{10} = \frac{1}{4}(II - XY - YX + ZZ) \quad (15)$$

$$\Sigma_{11} = \frac{1}{4}(II + XY + YX + ZZ) \quad (16)$$

1.3 Ξ States

The Ξ states can be used by expected energy estimation system 102 to obtain the coefficients of II, XX, YZ, and ZY.

$$|\Xi_{00}\rangle = \frac{1}{2}(|00\rangle + |01\rangle - |10\rangle + |11\rangle) \quad (17)$$

$$|\Xi_{01}\rangle = \frac{1}{2}(-|00\rangle + |01\rangle + |10\rangle + |11\rangle) \quad (18)$$

$$|\Xi_{10}\rangle = \frac{1}{2}(|00\rangle + |01\rangle + |10\rangle - |11\rangle) \quad (19)$$

$$|\Xi_{11}\rangle = \frac{1}{2}(|00\rangle - |01\rangle + |10\rangle + |11\rangle) \quad (20)$$

The corresponding density matrices of the above quantum states are as follows.

$$\Xi_{00} = \frac{1}{4}(II - XX + YZ - ZY) \quad (21)$$

$$\Xi_{01} = \frac{1}{4}(II + XX + YZ + ZY) \quad (22)$$

$$\Xi_{10} = \frac{1}{4}(II + XX - YZ - ZY) \quad (23)$$

$$\Xi_{11} = \frac{1}{4}(II - XX - YZ + ZY) \quad (24)$$

1.4 Unbiased Estimation of 2-Qubit System with Entangled Measurement

Expected energy estimation system 102 and/or the component(s) thereof (e.g., selection component 108, measurement component 110, state generation component 202, computation component 302, etc.) can perform one or more of the operations of the subject disclosure in accordance with one or more embodiments described herein based on an assumption that a Hamiltonian H is a 2-qubit Hamiltonian of the following form.

$$H = a_1 XX + a_2 XY + a_3 XZ + a_4 YX + a_5 YY + a_6 YZ + a_7 ZX + a_8 ZY + a_9 ZZ$$

Based on such a 2-qubit Hamiltonian H, expected energy estimation system 102 (e.g., via selection component 108, measurement component 110, state generation component 202, computation component 302, etc.) can execute algorithm 400a illustrated in FIG. 4A (where algorithm 400a is denoted as Algorithm 1 in FIG. 4A) to compute the unbiased estimate value of $\langle\psi|H|\psi\rangle$ by the following sampling.

Let $0 < \eta < 1$.

Lemma 1. For any $\epsilon > 0$, the output w of algorithm 400a (Algorithm 1) satisfies $|w - \langle\psi|H|\psi\rangle| \leq \epsilon$ with probability $1 - \eta$ whenever $$S \geq \frac{9(\max_\phi \langle\phi|H|\phi\rangle - \min_\psi \langle\psi|H|\psi\rangle)^2}{\epsilon^2} \log\frac{2}{\eta}$$

where the max and min are over all two-qubit states that can be computed with a simpler Variational Quantum Eigensolver (VQE) method.

FIG. 4A illustrates a diagram of an example, non-limiting algorithm 400a that can facilitate estimation of an expected energy value of a Hamiltonian based on data of the Hamiltonian, a quantum device that generates quantum states which will be used to compute the expected energy of a Hamiltonian of a quantum system and/or entangled measurements in accordance with one or more embodiments described herein. Repetitive description of like elements and/or processes employed in respective embodiments is omitted for sake of brevity.

With reference to algorithm 400a illustrated in FIG. 4A, for all t=1, 2, . . . , S, expected energy estimation system 102 can employ a quantum computer to prepare $|\psi\rangle$. For example, one or more cloud computing nodes 910 of cloud computing environment 950 described below and illustrated in FIG. 9 can comprise a quantum computer that can be employed by expected energy estimation system 102 to prepare $|\psi\rangle$. Expected energy estimation system 102 can employ selection component 108 to pick uniformly at random the basis b to be either Ω, Σ, or Ξ. Expected energy estimation system 102 can employ measurement component 110 to measure $|\psi\rangle$ in the basis b and record the result $v \in \{00,01,10,11\}$. Expected energy estimation system 102 (e.g., via state generation component 202) can let $|v_b\rangle$ be the state in the basis b with the measurement result v and can further employ computation component 302, which can comprise a classical computer, to compute $w_t = \langle v_b|H|v_b\rangle$. Based on executing algorithm 400a as described above, expected energy estimattion system 102 can return $$w = \frac{3}{S}\sum_{t=1}^{S} w_t.$$

Proof. Let $w_t$ be a random variable that can be obtained at each t=1, . . . , S. Expected energy estimation system 102 (e.g., via selection component 108, measurement component 110, state generation component 202, computation component 302, etc.) can thereby show that $$E[w_t] = \langle\psi|H|\psi\rangle.$$

Moreover, expected energy estimation system 102 (e.g., via selection component 108, measurement component 110, state generation component 202, computation component 302, etc.) can determine that $\min_\psi \langle\psi|H|\rangle \leq w_t \leq \max_\psi$ ⟨ψ|H|ψ⟩ holds for min and max over all entangled measurement which can be computed from simpler forms of Variational Quantum Eigensolver (VQE). Recalling the Chernoff-Hoeffding bounds, for independent random variables $a \leq X_i \leq b$ so that $X = \sum_{i=1}^{n} X_i$, and $\mu = E[X]$, it holds $$P[X \geq (1+\delta)\mu] \leq e^{-\frac{2\delta^2\mu^2}{n(b-a)^2}} \quad (25)$$

$$P[X \leq (1-\delta)\mu] \leq e^{-\frac{2\delta^2\mu^2}{n(b-a)^2}} \quad (26)$$

From the above Chernoff-Hoeffding bounds, expected energy estimation system 102 (e.g., via selection component 108, measurement component 110, state generation component 202, computation component 302, etc.) can further determine that $$P[|w - \langle\psi|H|\psi\rangle| \leq \epsilon] \geq 1 - 2e^{-\frac{S\epsilon^2}{9(b-a)^2}} \quad (27)$$

where $b \equiv \max_\psi \langle\psi|H|\psi\rangle$, and $a \equiv \min_\psi \langle\psi|H|\psi\rangle$. Therefore, expected energy estimation system 102 (e.g., via selection component 108, measurement component 110, state generation component 202, computation component 302, etc.) can implement the above procedure which can succeed with probability of at least $1-\eta$ when the number of repetition $$S \geq \frac{9(b-331\pm a)^2}{\epsilon^2} \log \frac{2}{\eta}.$$

1.5 Hamiltonian of Heisenberg Model

Expected energy estimation system 102 (e.g., via selection component 108, measurement component 110, state generation component 202, computation component 302, etc.) can generalize the above lemma to obtain an unbiased estimate for a Hamiltonian H of 2n-qubit system which is a sum of consecutive weight-2 k Pauli operators. Heisenberg model is one of such consecutive weight-2 k Pauli operators. For example, a standard Heisenberg model is as follows.

$$H = -J\sum_{j=1}^{N} \sigma_j \sigma_{j+1} - h\sum_{j=1}^{N} \sigma_j$$

where $\sigma_j$ is a Pauli spin-1/2 matrix.

To obtain an unbiased estimate of a sum of consecutive weight-2 k Pauli operators, expected energy estimation system 102 can employ state generation component 202 to denote (e.g., generate) the following quantum states which are the tensor product of two-qubit states.

$$|v_b^{even}\rangle = |v_{b_1}^{0,1}\rangle \otimes |v_{b_2}^{2,3}\rangle \otimes \ldots \otimes |v_{b_n}^{2n-2,2n-1}\rangle \quad (28)$$

$$|v_b^{odd}\rangle = |v_{b_1}^{2n-1,0}\rangle \otimes |v_{b_2}^{1,2}\rangle \otimes \ldots \otimes |v_{b_n}^{2n-3,2n-2}\rangle \quad (29)$$

The $|v_b^{even}\rangle$ defined above is the product states of 2-qubit states that entangle the 0th qubit with the 1st qubit, the 2nd with the 3rd, and so on, while the $|v_b^{odd}\rangle$ is the product states of 2-qubit states that entangle the 1st qubit with the 2nd qubit, the 3rd with the 4th, and so on. Each of the 2 qubit state is the labeled state in one of the previously mentioned $\Omega$, $\Sigma$, or $\Xi$ basis.

Similarly as the case for a 2-qubit system, expected energy estimation system 102 (e.g., via selection component 108, measurement component 110, state generation component 202, computation component 302, etc.) can obtain the following lemma.

Lemma 2. Let H be a 2n-qubit Hamiltonian which is a sum of weight-2 k Pauli operators. Then, for any $\epsilon > 0$ expected energy estimation system 102 (e.g., via selection component 108, measurement component 110, state generation component 202, computation component 302, etc.) can execute algorithm 400b illustrated in FIG. 4B (where algorithm 400b is denoted in FIG. 4B as Algorithm 2) to generate an output that satisfies $|w - \langle\psi|H|\psi\rangle| \leq \epsilon$ with probability of at least $1-\eta$ whenever $$S \geq \frac{4 \cdot 9^k (\max_\psi \langle\psi|H|\psi\rangle - \min_\phi \langle\phi|H|\phi\rangle)^2}{\epsilon^2} \log \frac{2}{\eta},$$

where the max and min are taken over all two-qubit product states, each of which can be computed by simpler forms of Variational Quantum Eigensolver (VQE).

FIG. 4B illustrates a diagram of an example, non-limiting algorithm 400b that can facilitate estimation of an expected energy value of a Hamiltonian based on data of the Hamiltonian, a quantum device that generates quantum states which will be used to compute the expected energy of a Hamiltonian of a quantum system and/or entangled measurements in accordance with one or more embodiments described herein. Repetitive description of like elements and/or processes employed in respective embodiments is omitted for sake of brevity.

With reference to algorithm 400b illustrated in FIG. 4B, for all t=1, 2, ..., S, expected energy estimation system 102 can employ one or more quantum devices (e.g., quantum computer(s)) to prepare $|\psi\rangle$. For example, one or more cloud computing nodes 910 of cloud computing environment 950 described below and illustrated in FIG. 9 can comprise a quantum computer that can be employed by expected energy estimation system 102 to prepare $|\psi\rangle$. Expected energy estimation system 102 can implement a script to flip a fair coin C to obtain EVEN or ODD. For i=1, 2, ..., n, expected energy estimation system 102 can employ selection component 108 to pick uniformly at random the basis b to be either $\Omega$, $\Sigma$, or $\Xi$. If C is EVEN, expected energy estimation system 102 can employ measurement component 110 to measure 2(i−1) and 2i−1 qubits. Otherwise, if C is ODD, expected energy estimation system 102 can employ measurement component 110 to measure 2i−1 and 2i qubits of $|\psi\rangle$ in the basis b and record the result $v_b \in 00,01,10,11$. Expected energy estimation system 102 (e.g., via state generation component 202) can let $|v_b^C\rangle$ be the quantum state obtained from n entangled measurements and can further employ computation component 302, which can comprise a classical computer, to compute $w_t = \langle v_b^C|H|v_b^C\rangle$. Based on executing algorithm 400b as described above, expected energy estimation system 102 (e.g., via selection component 108, measurement component 110, state generation component 202, computation component 302, etc.) can return $$w = \frac{2 \cdot 3^k}{S} \sum_{t=1}^{S} w_t.$$

Proof. The proof follows similarly as described in the previous lemma by utilizing the Chernoff-Hoeffding bounds.

1.6 A Special Case of Heisenberg Model

For a limited type of Heinsenberg model, as below, expected energy estimation system 102 (e.g., via selection component 108, measurement component 110, state generation component 202, computation component 302, etc.) can use a better entangled measurement.

$$H = -\frac{1}{2}\sum_{j=1}^{N}\left(J_x\sigma_j^x\sigma_{j+1}^x + J_y\sigma_j^y\sigma_{j+1}^y + J_z\sigma_j^z\sigma_{j+1}^z + h_j\sigma_j^z\right)$$

where $\sigma_j^{x,y,z}$ is a Pauli spin-1/2 matrix and there are only XX, YY, and ZZ interactions.

Expected energy estimation system 102 (e.g., via selection component 108, measurement component 110, state generation component 202, computation component 302, etc.) can employ the Bell states as bases for measurement, where the Bell states are:

$$|\psi_{00}\rangle = \frac{1}{\sqrt{2}}(|00\rangle + |11\rangle) \quad (30)$$

$$|\psi_{01}\rangle = \frac{1}{\sqrt{2}}(|00\rangle - |11\rangle) \quad (31)$$

$$|\psi_{10}\rangle = \frac{1}{\sqrt{2}}(|01\rangle + |10\rangle) \quad (32)$$

$$|\psi_{11}\rangle = \frac{1}{\sqrt{2}}(|01\rangle - |11\rangle) \quad (33)$$

The corresponding density matrices of the above quantum states are as follows.

$$\Psi_{00} = \frac{1}{4}(II + XX - YY + ZZ) \quad (34)$$

$$\Psi_{01} = \frac{1}{4}(II - XX + YY + ZZ) \quad (35)$$

$$\Psi_{10} = \frac{1}{4}(II + XX + YY - ZZ) \quad (36)$$

$$\Psi_{11} = \frac{1}{4}(II - XX - YY - ZZ) \quad (37)$$

For the Heinsenberg model with only XX, YY, and ZZ interaction, expected energy estimation system 102 (e.g., via selection component 108, measurement component 110, state generation component 202, computation component 302, etc.) can now use the Bell states $|\psi_{b_1,b_2}\rangle$ as bases for measurement at algorithm 400b (Algorithm 2) illustrated in FIG. 4B instead of choosing randomly from $\Omega$, $\Sigma$, or $\Xi$ bases. This time, $$w = \frac{2}{S}\sum_{t=1}^{S}w_t.$$

By a simple calculation, expected energy estimation system 102 (e.g., via selection component 108, measurement component 110, state generation component 202, computation component 302, etc.) can use Lemma 2 above to show that to have an estimate with probability at least $1-\eta$, it suffices to have $$S \geq \frac{4(\max_\psi\langle\psi|H|\psi\rangle - \min_\phi\langle\psi|H|\psi\rangle)^2}{\epsilon^2}\log\frac{2}{\eta},$$

which is 9 times smaller than using algorithm 400b (Algorithm 2) as it is.

2.0 Exploiting Partial Knowledge for Estimating Observables

Using a Hamiltonian H of an n-qubit system that is a sum of weight-k Pauli operators of arbitrary coefficients, where the distribution of Pauli bases that comprise H is fixed for all terms in the Hamiltonian (e.g., the ratios of the Pauli bases {x, y, z} are known to be fixed) and using the ratio of x:y:z is $\alpha:(1-\alpha)/2:(1-\alpha)/2$, for $0\leq\alpha\leq1$, expected energy estimation system 102 (e.g., via selection component 108, measurement component 110, state generation component 202, computation component 302, etc.) can obtain the estimation of $f(\psi)\equiv\langle\psi|H|\psi\rangle$ for a quantum state $|\psi\rangle$. Expected energy estimation system 102 (e.g., via selection component 108, measurement component 110, state generation component 202, computation component 302, etc.) can compute the estimation from the weighted average thru $|v_b\rangle = |v_{b_1}^1\rangle \otimes |v_{b_2}^2\rangle \otimes \ldots \otimes |v_{b_n}^n\rangle$, where $|v_{b_i}^i\rangle$ is a quantum state {$|0\rangle$, $|1\rangle$} in the basis of {x, y, z}.

Expected energy estimation system 102 (e.g., via selection component 108, measurement component 110, state generation component 202, computation component 302, etc.) can execute the procedure below and/or algorithm 400c illustrated in FIG. 4C (where algorithm 400c is denoted as Algorithm 3 in FIG. 4C) to estimate $f(\psi)$ (e.g., to estimate $f(|\psi\rangle)$).

FIG. 4C illustrates a diagram of an example, non-limiting algorithm 400c that can facilitate estimation of an expected energy value of a Hamiltonian based on data of the Hamiltonian, a quantum device that generates quantum states which will be used to compute the expected energy of a Hamiltonian of a quantum system and/or entangled measurements in accordance with one or more embodiments described herein. Repetitive description of like elements and/or processes employed in respective embodiments is omitted for sake of brevity.

With reference to algorithm 400c illustrated in FIG. 4C, for all t=1, 2, . . . , S, expected energy estimation system 102 can employ one or more quantum devices (e.g., quantum computer(s)) to prepare $|\psi\rangle$. For example, one or more cloud computing nodes 910 of cloud computing environment 950 described below and illustrated in FIG. 9 can comprise a quantum computer that can be employed by expected energy estimation system 102 to prepare $|\psi\rangle$. For i=1, 2, . . . , n, expected energy estimation system 102 can employ selection component 108 to pick the basis $b_i$ to be either x, y, or z with probability $\alpha$, $(1-\alpha)/2$, $(1-\alpha)/2$, respectively. Expected energy estimation system 102 can employ measurement component 110 to measure $|\psi\rangle$ in the basis $b_i$ and record the result $v^i \in \{0,1\}$. Expected energy estimation system 102 (e.g., via state generation component 202) can let $|v_b\rangle = |v_{b_1}^1\rangle \otimes |v_{b_2}^2\rangle \otimes \ldots \otimes |v_{b_n}^n\rangle$ and can further employ computation component 302, which can comprise a classical computer, to compute $w_t = \langle v_b|H|v_b\rangle$. Based on executing algorithm 400c as described above, expected energy estimation system 102 can return $$w = \frac{\left(\alpha^\alpha\left(\frac{1-\alpha}{2}\right)^{(1-\alpha)}\right)^{-k}}{S}\sum_{t=1}^{S}w_t.$$

Note that $$\left(\alpha^\alpha \left(\frac{1-\alpha}{2}\right)^{(1-\alpha)}\right) \geq 1/3$$

for $0 \leq \alpha \leq 1$.

Lemma 3. With high probability $|w - \langle \psi|H|\psi \rangle| \leq \epsilon$, where $$\epsilon = \frac{\left(\alpha^\alpha \left(\frac{1-\alpha}{2}\right)^{(1-\alpha)}\right)^{-k}}{S^{1/2}} \max_\phi |\langle \phi|H|\phi\rangle|$$

and the max is over all separable states.

Proof. Described below is the proof idea, where the basis $b = b_1, b_2, \ldots, b_n$ can be chosen by expected energy estimation system 102 and/or the component(s) thereof (e.g., selection component 108, measurement component 110, state generation component 202, computation component 302, etc.) with probability $$\alpha^{n_x} \left(\frac{1-\alpha}{2}\right)^{n_y} \left(\frac{1-\alpha}{2}\right)^{n_z},$$

where $n_x + n_y + n_z = n$, and $n_x$, $n_y$, $n_z$ are the number of bases x, y, z. The $v \in \{0,1\}^n$ can be obtained by expected energy estimation system 102 (e.g., via selection component 108, measurement component 110, state generation component 202, computation component 302, etc.) with probability $|\langle v_b|\psi\rangle|^2$. Expected energy estimation system 102 (e.g., via selection component 108, measurement component 110, state generation component 202, computation component 302, etc.) can evaluate $E[w_1]$ defined as below.

$$E[w_1] = \sum_{b \in \{x,y,z\}^n} \alpha^{n_x} \left(\frac{1-\alpha}{2}\right)^{n_y} \left(\frac{1-\alpha}{2}\right)^{n_z} \sum_{v \in \{0,1\}^n} |\langle v_b | \psi \rangle|^2 \cdot \langle v_b|H|v_b\rangle =$$

$$\left\langle \psi \left| \left( \sum_{b \in \{x,y,z\}^n} \alpha^{n_x} \left(\frac{1-\alpha}{2}\right)^{n_y} \left(\frac{1-\alpha}{2}\right)^{n_z} \sum_{v \in \{0,1\}^n} \langle v_b|H|v_b\rangle \cdot |v_b\rangle\langle v_b| \right) \right| \psi \right\rangle$$

With regards to the summation in the above, the non-zero values happen when the bases $b = b_1 \ldots b_n$ coincides with the weight-k Pauli operators. There are $\alpha$ fraction of x's, $(1-\alpha)/2$ fraction of y's, and $(1-\alpha)/2$ fraction of z's in the weight-k Pauli operators. For this reason, $$\sum_{b \in \{x,y,z\}^n} \alpha^{n_x} \left(\frac{1-\alpha}{2}\right)^{n_y} \left(\frac{1-\alpha}{2}\right)^{n_z} \sum_{v \in \{0,1\}^n} \langle v_b|H|v_b\rangle \cdot |v_b\rangle\langle v_b| =$$

$$\sum_{b \in \{x,y,z\}^{n-k}, b*} \alpha^{n_x'} \left(\frac{1-\alpha}{2}\right)^{n_y'} \left(\frac{1-\alpha}{2}\right)^{n_z'} \left(\alpha^\alpha \left(\frac{1-\alpha}{2}\right)^{1-\alpha}\right)^k \sum_{v \in \{0,1\}^n} \langle v_b|H|v_b\rangle \cdot |v_b\rangle$$

$$\left\langle v_b = \left(\alpha^\alpha \left(\frac{1-\alpha}{2}\right)^{1-\alpha}\right)^k H \right.$$

where $n'_x + n'_y + n'_z = n - k$ in the above, that corresponds to the non-matching weight-k Pauli operators. Therefore, $$E[w_1] = \left(\alpha^\alpha \left(\frac{1-\alpha}{2}\right)^{1-\alpha}\right)^k \langle\psi|H|\psi\rangle$$

Because $$w = \left(\alpha^\alpha \left(\frac{1-\alpha}{2}\right)^{1-\alpha}\right)^{-k} w_1,$$

$$E[w] = \langle\psi|H|\psi\rangle$$

Similarly, expected energy estimation system 102 (e.g., via selection component 108, measurement component 110, state generation component 202, computation component 302, etc.) can determine that the standard deviation of w is $$\sigma_w \leq \left(\alpha^\alpha \left(\frac{1-\alpha}{2}\right)^{1-\alpha}\right)^{-k} \max_{b,v} \langle v_b|H|v_b\rangle$$

If the ratios of $\{x, y, z\}$ are known to be fixed for all terms in the Hamiltonian $\alpha_x$, $\alpha_y$, $\alpha_z$ so that $\alpha_x + \alpha_y + \alpha_z = 1$, then expected energy estimation system 102 can employ selection component 108 to choose the basis with probability $\alpha_x$, $\alpha_y$, $\alpha_z$. Following the same argument as above, expected energy estimation system 102 and/or the component(s) thereof (e.g., selection component 108, measurement component 110, state generation component 202, computation component 302, etc.) can replace the term $$\left(\alpha^\alpha \left(\frac{1-\alpha}{2}\right)^{1-\alpha}\right)$$

with $(\alpha_x^{\alpha_x} \alpha_y^{\alpha_y} (1 - \alpha_x - \alpha_y)^{1-\alpha_x-\alpha_y}) \geq 1/3$. It is at least 1/3 for any positive $\alpha_x$, $\alpha_y$ such that $0 \leq \alpha_x + \alpha_y \leq 1$. If the ratios of $\{x, y, z\}$ are different for each term in the Hamiltonian, then by setting $\alpha_x = \alpha_y = \alpha_z = 1/3$ the expected energy estimation system 102 can employ selection component 108 to choose the basis with probability $\alpha_x$, $\alpha_y$, $\alpha_z$.

Expected energy estimation system 102 can be associated with various technologies. For example, expected energy estimation system 102 can be associated with quantum computing technologies, quantum hardware and/or software technologies, quantum algorithm technologies, machine learning technologies, artificial intelligence technologies, cloud computing technologies, and/or other technologies.

Expected energy estimation system 102 can provide technical improvements to systems, devices, components, operational steps, and/or processing steps associated with the various technologies identified above. For example, expected energy estimation system 102 can reduce the number of quantum state measurements captured to estimate the expected energy value of a Hamiltonian within an error threshold $\epsilon$ in a variational quantum eigensolver (VQE) algorithm based on data of the Hamiltonian and/or entangled measurements. In another example, based on such reduced number of quantum state measurements, expected energy estimation system 102 can reduce execution time of a quantum system (e.g., a quantum computer, quantum processor, etc.) to execute a variational quantum eigensolver (VQE) algorithm.

Expected energy estimation system 102 can provide technical improvements to a processing unit (e.g., processor 106) associated with a classical computing device and/or a quantum computing device (e.g., a quantum processor, quantum hardware, superconducting circuit, etc.) associated with expected energy estimation system 102. For example, by reducing the number of quantum state measurements to estimate the expected energy value of a Hamiltonian in a VQE algorithm and/or reducing execution time of a quantum system to execute the VQE algorithm as described above, expected energy estimation system 102 can reduce computational costs of a processor (e.g., processor 106, a quantum processor, etc.) that executes such quantum state measurements and/or the VQE algorithm.

Based on such reduced computational costs described above, a practical application of expected energy estimation system 102 is that it can be implemented by a quantum computing system and/or administrator (e.g., vendor) operating such a system to execute a VQE algorithm in a variety of domains and/or on a variety of problems ranging in complexity.

It should be appreciated that expected energy estimation system 102 provides a new approach driven by relatively new quantum computing technologies. For example, expected energy estimation system 102 provides a new approach to efficiently estimate the expected energy value of a Hamiltonian to execute a VQE algorithm on a quantum computing device that is driven by currently long and computationally expensive methods used to estimate such an expected energy value of a Hamiltonian.

Expected energy estimation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Expected energy estimation system 102 and/or components thereof, can be employed to solve new problems that arise through advancements in technologies mentioned above, employment of quantum computing systems, cloud computing systems, computer architecture, and/or another technology.

It is to be appreciated that expected energy estimation system 102 can utilize various combinations of electrical components, mechanical components, and circuitry that cannot be replicated in the mind of a human or performed by a human, as the various operations that can be executed by expected energy estimation system 102 and/or components thereof as described herein are operations that are greater than the capability of a human mind. For instance, the amount of data processed, the speed of processing such data, or the types of data processed by expected energy estimation system 102 over a certain period of time can be greater, faster, or different than the amount, speed, or data type that can be processed by a human mind over the same period of time.

According to several embodiments, expected energy estimation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that expected energy estimation system 102 can include information that is impossible to obtain manually by an entity, such as a human user. For example, the type, amount, and/or variety of information included in expected energy estimation system 102, selection component 108, measurement component 110, state generation component 202 and/or computation component 302 can be more complex than information obtained manually by a human user.

Figure 5:
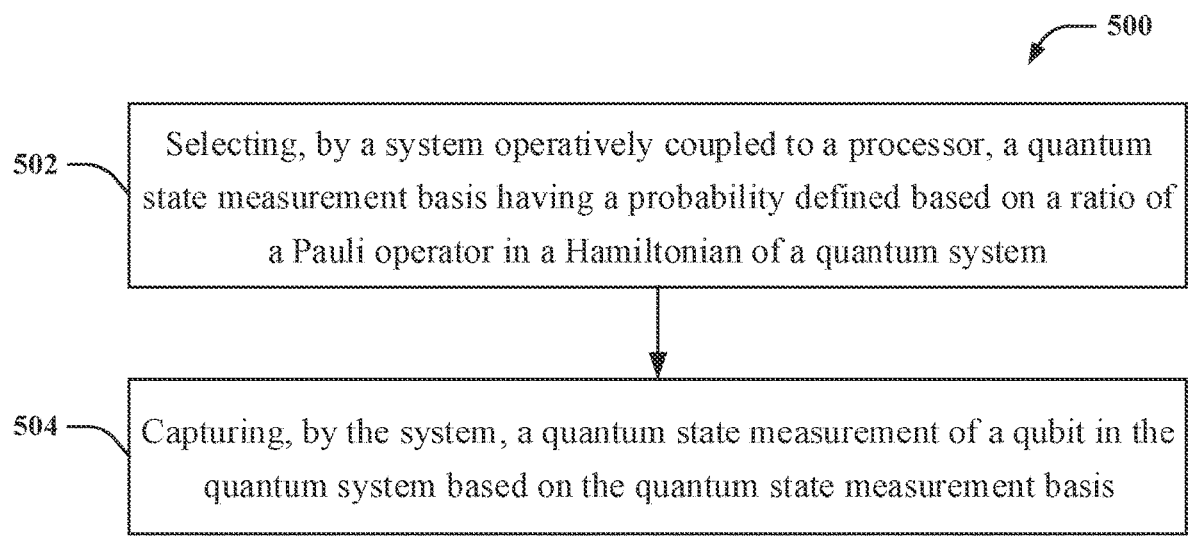
FIG. 5 illustrates a flow diagram of an example, non-limiting computer-implemented method that can facilitate estimation of an expected energy value of a Hamiltonian based on data of the Hamiltonian, a quantum state produced by a quantum device and/or entangled measurements in accordance with one or more embodiments described herein.

FIG. 5 illustrates a flow diagram of an example, non-limiting computer-implemented method 500 that can facilitate estimation of an expected energy value of a Hamiltonian based on data of the Hamiltonian and/or entangled measurements in accordance with one or more embodiments described herein. Repetitive description of like elements and/or processes employed in respective embodiments is omitted for sake of brevity.

At 502, computer-implemented method 500 can comprise selecting, by a system (e.g., via expected energy estimation system 102 and/or selection component 108) operatively coupled to a processor (e.g., processor 106, a quantum processor, etc.), a quantum state measurement basis having a probability defined based on a ratio of a Pauli operator in a Hamiltonian of a quantum system.

At 504, computer-implemented method 500 can comprise capturing, by the system (e.g., via expected energy estimation system 102 and/or measurement component 110), a quantum state measurement of a qubit in the quantum system based on the quantum state measurement basis.

Figure 6:
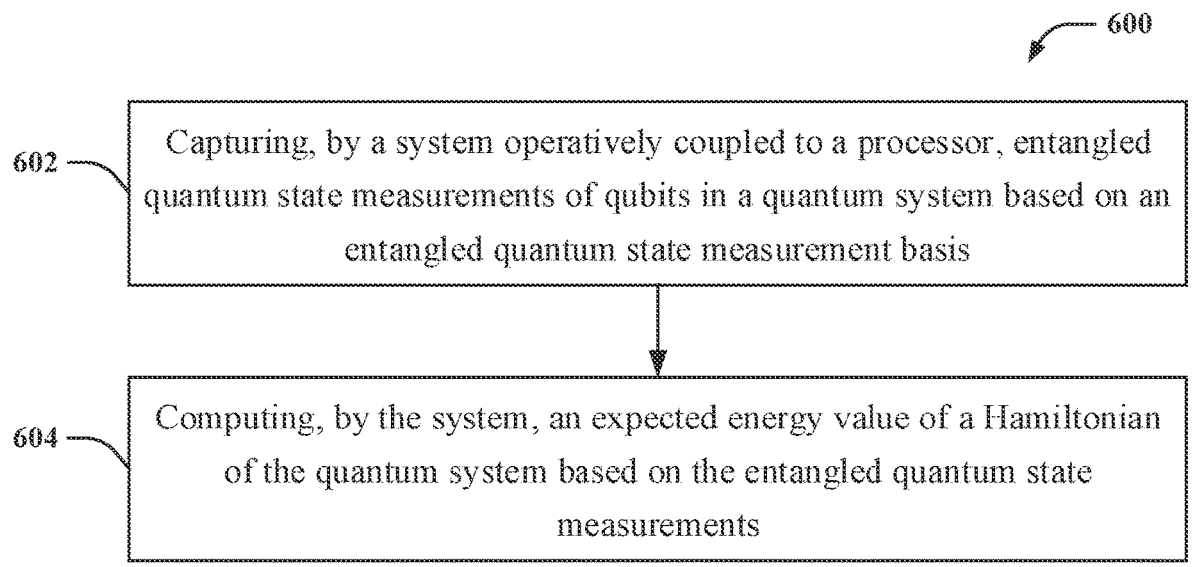
FIG. 6 illustrates a flow diagram of an example, non-limiting computer-implemented method that can facilitate estimation of an expected energy value of a Hamiltonian based on data of the Hamiltonian, a quantum state produced by a quantum device and/or entangled measurements in accordance with one or more embodiments described herein.

FIG. 6 illustrates a flow diagram of an example, non-limiting computer-implemented method 600 that can facilitate estimation of an expected energy value of a Hamiltonian based on data of the Hamiltonian and/or entangled measurements in accordance with one or more embodiments described herein. Repetitive description of like elements and/or processes employed in respective embodiments is omitted for sake of brevity.

At 602, computer-implemented method 600 can comprise capturing, by a system (e.g., via expected energy estimation system 102 and/or measurement component 110) operatively coupled to a processor (e.g., processor 106, a quantum processor, etc.), entangled quantum state measurements of qubits in a quantum system based on an entangled quantum state measurement basis.

At 604, computer-implemented method 600 can comprise computing, by the system (e.g., via expected energy estimation system 102 and/or computation component 302), an expected energy value of a Hamiltonian of the quantum system based on the entangled quantum state measurements.

Figure 7:
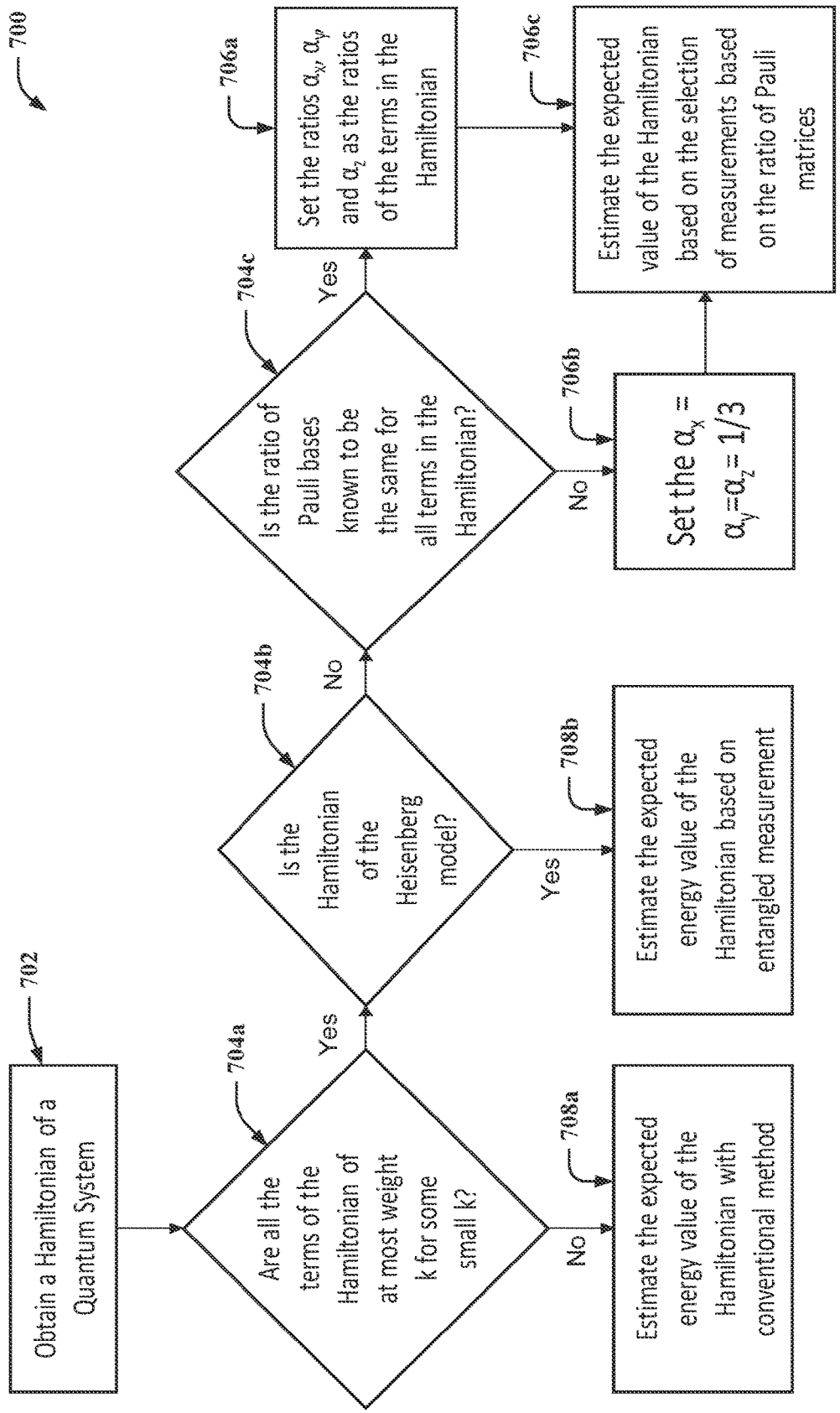
FIG. 7 illustrates a flow diagram of an example, non-limiting computer-implemented method that can facilitate estimation of an expected energy value of a Hamiltonian based on data of the Hamiltonian, a quantum state produced by a quantum device and/or entangled measurements in accordance with one or more embodiments described herein.

FIG. 7 illustrates a flow diagram of an example, non-limiting computer-implemented method 700 that can facilitate estimation of an expected energy value of a Hamiltonian based on data of the Hamiltonian and/or entangled measurements in accordance with one or more embodiments described herein. Repetitive description of like elements and/or processes employed in respective embodiments is omitted for sake of brevity.

At 702, computer-implemented method 700 can comprise obtaining a Hamiltonian of a quantum system. For example, expected energy estimation system 102 can obtain (e.g., receive) a Hamiltonian of a quantum system including, but not limited to, an n-qubit quantum system, a 2n-qubit quantum system, and/or another quantum system. For example, expected energy estimation system 102 can comprise an interface component (e.g., an application programming interface (API), a graphical user interface (GUI), etc.))

through which it can receive such a Hamiltonian of a quantum system defined above.

At 704a, 704b, 704c, computer-implemented method 700 can comprise determining whether data of ratios of the Pauli basis of the Hamiltonian is known to satisfy several properties. For example, expected energy estimation system 102 (e.g., via read and/or write operations executed by processor 106) can determine at 704a whether the Hamiltonian is an n-qubit system which is a sum of at most weight-k Pauli strings (e.g., are all the terms of the Hamiltonian of at most weight-k for some small k?). In another example, expected energy estimation system 102 (e.g., via read and/or write operations executed by processor 106) can determine at 704b) whether the Hamiltonian is a sum of consecutive weight-2 k Pauli strings (e.g., is the Hamiltonian of the Heisenberg model?). In another example, expected energy estimation system 102 (e.g., via read and/or write operations executed by processor 106) can determine at 704c whether the ratios of Pauli basis for each term in the Hamiltonian are the same (e.g., is the ratio of Pauli bases known to be the same for all terms in the Hamiltonian?).

If it is determined at 704a, 704b, and/or 704c that data of the Hamiltonian satisfy some of the aforementioned properties, computer-implemented method 700 can comprise estimating (e.g., via expected energy estimation system 102, selection component 108, measurement component 110, state generation component 202, and/or computation component 302) the expected energy value of the Hamiltonian based on the known data of the Hamiltonian. For example, if data of a Hamiltonian is known to satisfy all the properties, at 706a, 706b, 706c, expected energy estimation system 102 (e.g., via selection component 108, measurement component 110, state generation component 202, computation component 302, etc.) can estimate an expected energy value of the Hamiltonian based on such data of the Hamiltonian by implementing the process described above with reference to section 2.0 (e.g., by implementing one or more quantum states, equations, algorithms, and/or lemmas defined above in section 2.0).

If it is determined at 704a, 704b, and/or 704c that data of the Hamiltonian is not following the aforementioned properties, computer-implemented method 700 can comprise estimating the expected energy value of the Hamiltonian using one or more of the methods described here at 708a and/or 708b. For example, if it is determined at 704a that not all of the terms of the Hamiltonian are of at most weight-k for some small k, at 708a, computer-implemented method 700 can comprise estimating the expected energy value of the Hamiltonian using a conventional method.

In another example, if it is determined at 704b that data of the Hamiltonian is not following the aforementioned properties, computer-implemented method 700 can comprise determining whether the Hamiltonian is of a Heisenberg model. For example, at 704b, expected energy estimation system 102 (e.g., via read and/or write operations executed by processor 106) can determine whether the Hamiltonian comprises a Hamiltonian of a 2n-qubit system which is a sum of consecutive weight-2 k Pauli operators. If it is determined at 704b that the Hamiltonian is in the form of a Heisenberg model, at 708b, computer-implemented method 700 can comprise estimating (e.g., via expected energy estimation system 102, selection component 108, measurement component 110, state generation component 202, computation component 302, etc.) the expected energy value of the Hamiltonian based on entangled measurements. For instance, if the Hamiltonian is in the form of a Heisenberg model, expected energy estimation system 102 (e.g., via selection component 108, measurement component 110, state generation component 202, computation component 302, etc.) can implement one or more quantum states, equations, algorithms, and/or lemmas defined above in sections 1.0-1.6.

If it is determined at 704b that the Hamiltonian is not in the form of a Heisenberg model, computer-implemented method 700 can comprise ending and/or proceed with employing partial or full tomography on the qubit system.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
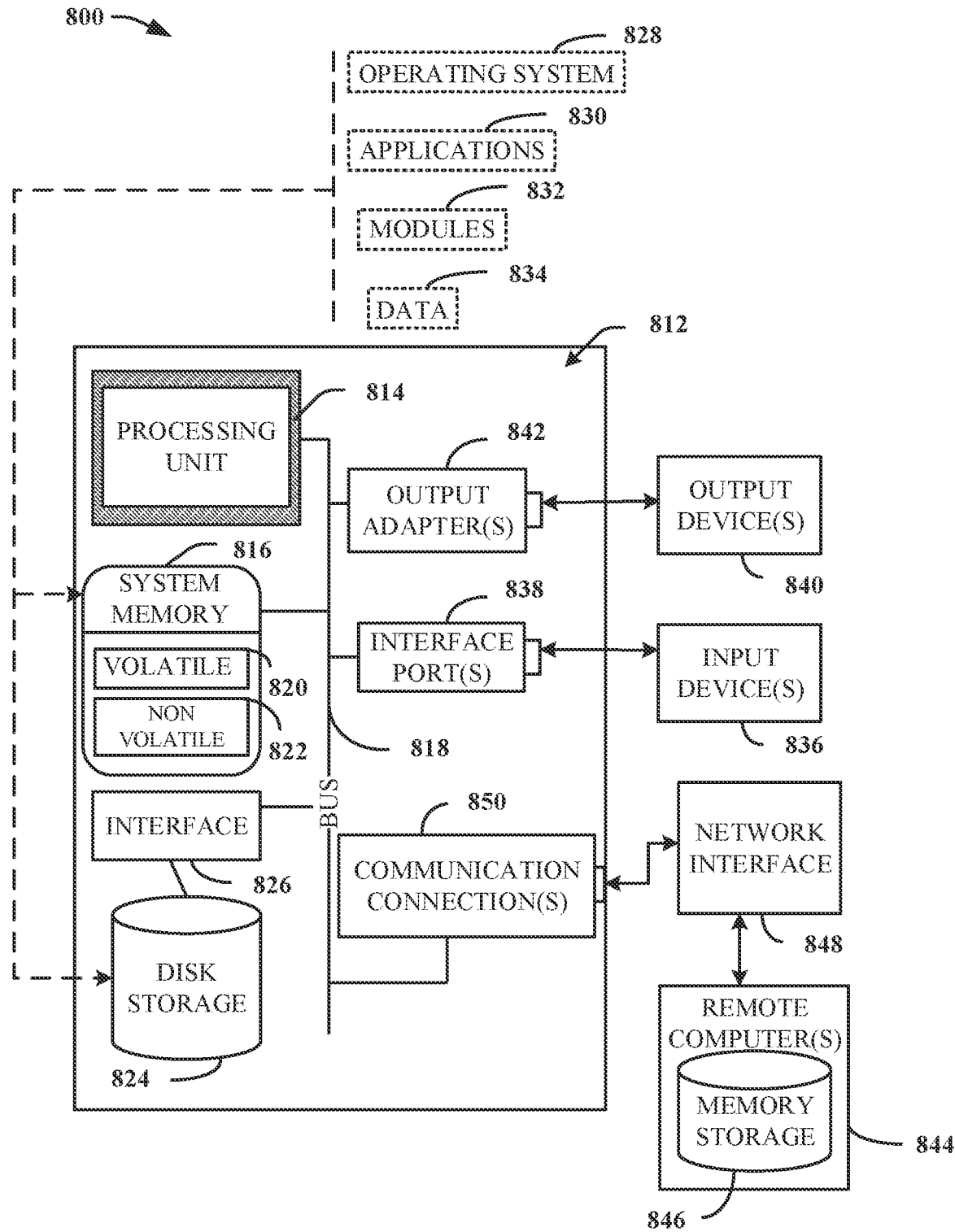
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
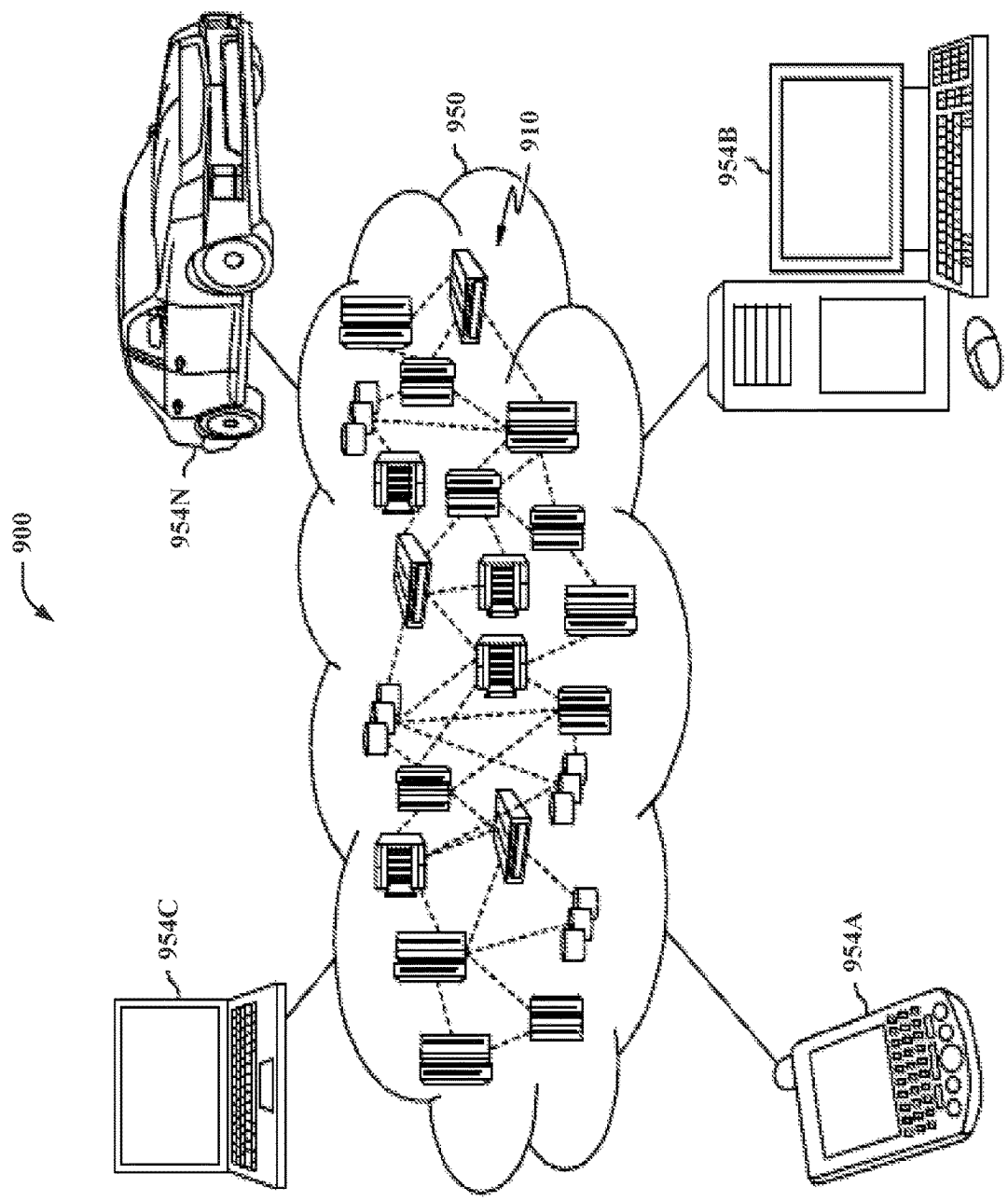
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
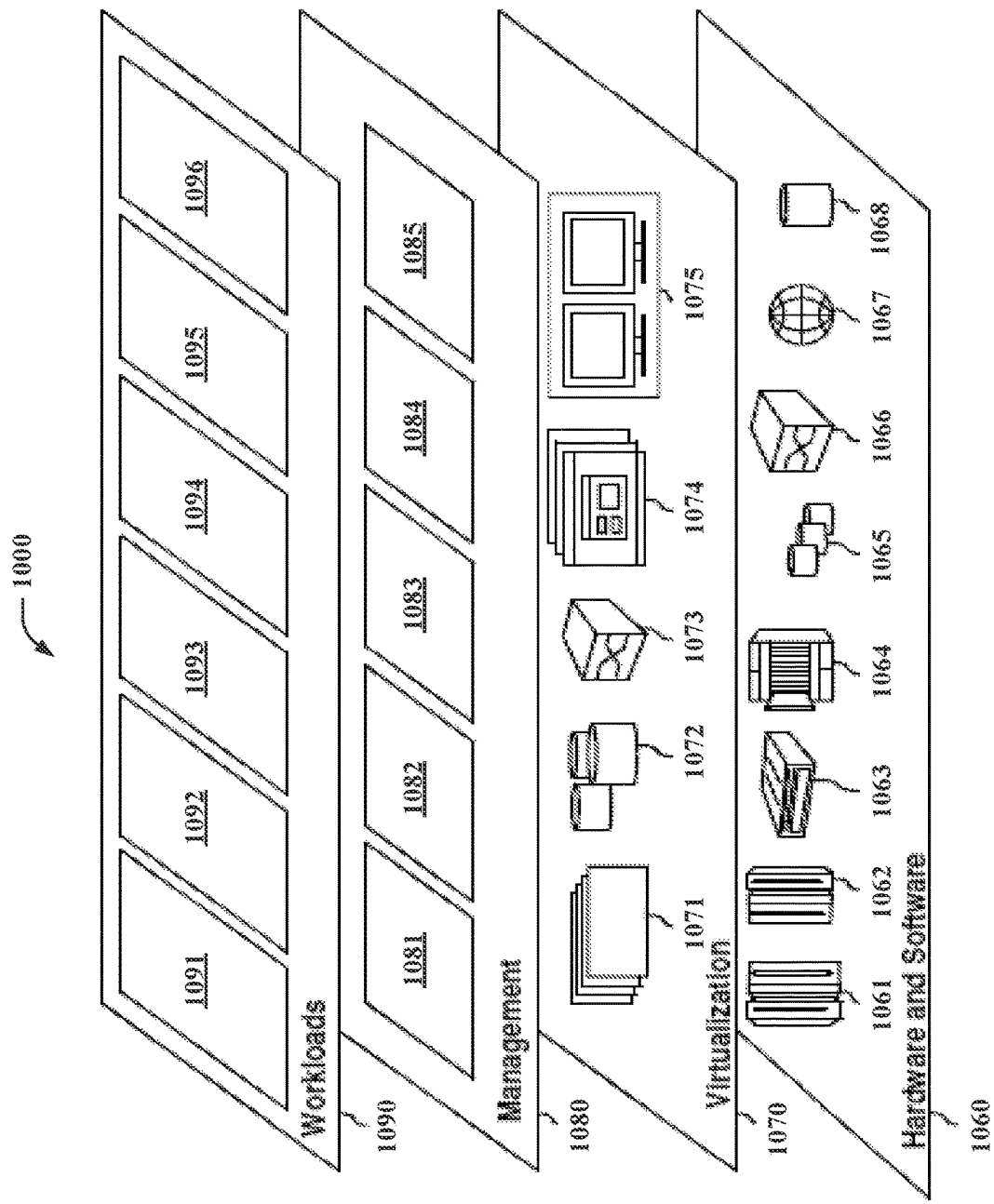
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, quantum platform routing software 1068, and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and expected energy estimation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a quantum device that generates quantum states; and
a processor that executes the computer executable components stored in the memory, wherein the computer executable components comprise:
   a measurement component that measures entangled quantum state measurements of qubits in a quantum system based on an entangled quantum state measurement basis selected based on a ratio of Pauli basis in a Hamiltonian of the quantum system; and
   a computation component that determines an expected energy value of the Hamiltonian of the quantum system based on the entangled quantum state measurements.

2. The system of claim 1, wherein the entangled quantum state measurement basis comprises a two qubit quantum state.

3. The system of claim 1, wherein the Hamiltonian comprises a sum of consecutive weighted Pauli strings comprising a defined number of nonidentity Pauli matrices.

4. The system of claim 1, wherein the measurement component measures the entangled quantum state measurements of the qubits based on the entangled quantum state measurement basis to reduce at least one of: a number of quantum state measurements of the qubits used to determine the expected energy value of the Hamiltonian; or execution time of the quantum system to execute a variational quantum eigensolver algorithm.

5. The system of claim 1, wherein the computer executable components further comprise:
a state generation component that generates a quantum state based on multiple entangled quantum state measurements of the qubits determined based on multiple entangled quantum state measurement bases.

6. The system of claim 1, wherein the measurement component further measures the entangled quantum state measurements of the qubits based on an even result or an odd result of a flipped fair coin.

7. The system of claim 1, wherein the measurement component, in response to determining that the ratio of Pauli basis is fixed, selects the entangled quantum state measurement basis having a probability defined based on a ratio of a Pauli operator in the Hamiltonian of the quantum system.

8. The system of claim 1, wherein the measurement component, in response to determining that the ratio of Pauli basis is not fixed, selects the entangled quantum state measurement basis having a probability uniform at random.

9. A computer-implemented method, comprising:
measuring, by a system operatively coupled to a processor, entangled quantum state measurements of qubits in a quantum system based on an entangled quantum state measurement basis selected based on a ratio of Pauli basis in a Hamiltonian of the quantum system; and
determining, by the system, an expected energy value of the Hamiltonian of the quantum system based on the entangled quantum state measurements.

10. The computer-implemented method of claim 9, wherein the entangled quantum state measurement basis comprises a two qubit quantum state.

11. The computer-implemented method of claim 9, wherein the Hamiltonian comprises a sum of consecutive weighted Pauli strings comprising a defined number of nonidentity Pauli matrices.

12. The computer-implemented method of claim 9, wherein the measuring comprises:
measuring, by the system, the entangled quantum state measurements of the qubits in the quantum system based on the entangled quantum state measurement basis to reduce at least one of: a number of quantum state measurements of the qubits used to determine the expected energy value of the Hamiltonian; or execution time of the quantum system to execute a variational quantum eigensolver algorithm.

13. The computer-implemented method of claim 9, further comprising:
generating, by the system, a quantum state based on multiple entangled quantum state measurements of the qubits determined based on multiple entangled quantum state measurement bases.

14. The computer-implemented method of claim 9, wherein the measuring further comprises:
measuring, by the system, the entangled quantum state measurements of the qubits based on an even result or an odd result of a flipped fair coin.

15. A computer program product facilitating a process to estimate an expected energy value of a Hamiltonian, the computer program product comprising a computer readable storage medium having program instructions embodied therewith, the program instructions executable by a processor to cause the processor to:

measure, by the processor, entangled quantum state measurements of qubits in a quantum system based on an entangled quantum state measurement basis selected based on a ratio of Pauli basis in the Hamiltonian of the quantum system; and determine, by the processor, the expected energy value of the Hamiltonian of the quantum system based on the entangled quantum state measurements.

16. The computer program product of claim 15, wherein the entangled quantum state measurement basis comprises a two qubit quantum state.

17. The computer program product of claim 15, wherein the Hamiltonian comprises a sum of consecutive weighted Pauli strings comprising a defined number of nonidentity Pauli matrices.

18. The computer program product of claim 15, wherein the program instructions are further executable by the processor to cause the processor to:

measure, by the processor, the entangled quantum state measurements of the qubits in the quantum system based on the entangled quantum state measurement basis to reduce at least one of: a number of quantum state measurements of the qubits used to determine the expected energy value of the Hamiltonian; or execution time of the quantum system to execute a variational quantum eigensolver algorithm.

19. The computer program product of claim 15, wherein the program instructions are further executable by the processor to cause the processor to:

generate, by the processor, a quantum state based on multiple entangled quantum state measurements of the qubits determined based on multiple entangled quantum state measurement bases.

20. The computer program product of claim 15, wherein the program instructions are further executable by the processor to cause the processor to:

measure, by the processor, the entangled quantum state measurements of the qubits based on an even result or an odd result of a flipped fair coin.

\* \* \* \* \*